United States Patent
Jorgenson

[15] 3,688,602
[45] Sept. 5, 1972

[54] AUTOMATIC TRANSMISSION FOR A VEHICLE

[72] Inventor: Leroy D. Jorgenson, 3827 Laguna Ave., Oakland, Calif. 94602

[22] Filed: Sept. 8, 1970

[21] Appl. No.: 70,314

[52] U.S. Cl. ................................... 74/754, 74/761
[51] Int. Cl. ............................................. F16h 3/44
[58] Field of Search ............................. 74/754, 761

[56] References Cited

UNITED STATES PATENTS

| | | | |
|---|---|---|---|
| 2,907,232 | 10/1959 | Duffy | 74/754 |
| 3,233,478 | 2/1966 | General et al. | 74/761 |
| 3,605,507 | 9/1971 | Ishihara | 74/761 |

*Primary Examiner*—C. J. Husar
*Attorney*—Mellin, Moore & Weissenberger

[57] ABSTRACT

An automatic transmission for vehicles or the like comprising an input shaft having gears at each end and a front end plate assembly thereon. A high gear clutch drum assembly engages the front end plate assembly. The clutch drum assembly includes a clutch for providing only a low and high forward speed and is in hydraulic fluid communication with a hydraulic fluid delivery sleeve on the end plate assembly. A planetary gear assembly engages the gears on one end of the shaft and includes planetary gears for engaging gears on the clutch drum assembly. A housing encloses the shaft and all assemblies in a substantially fluid-tight relationship with the gears on the free end of the shaft adapted to be coupled to the clutch of the vehicle and a rear end plate assembly including the planetary gear assembly being coupled in driving relationship to the differential of the vehicle. In this manner, the transmission can be moved quickly through gears as required for competition racing when hydraulic fluid is selectively supplied to the clutch drum assembly.

9 Claims, 5 Drawing Figures

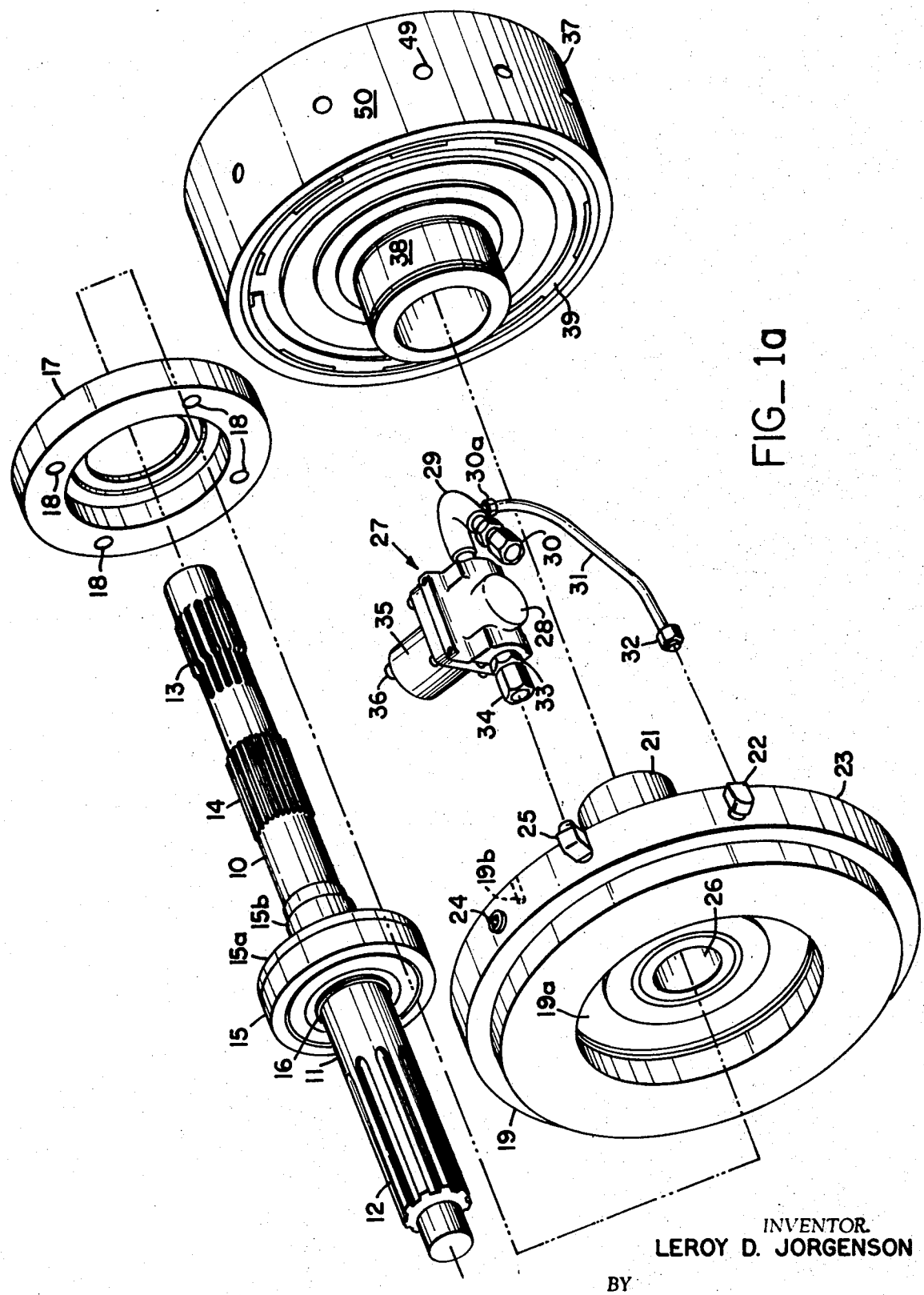

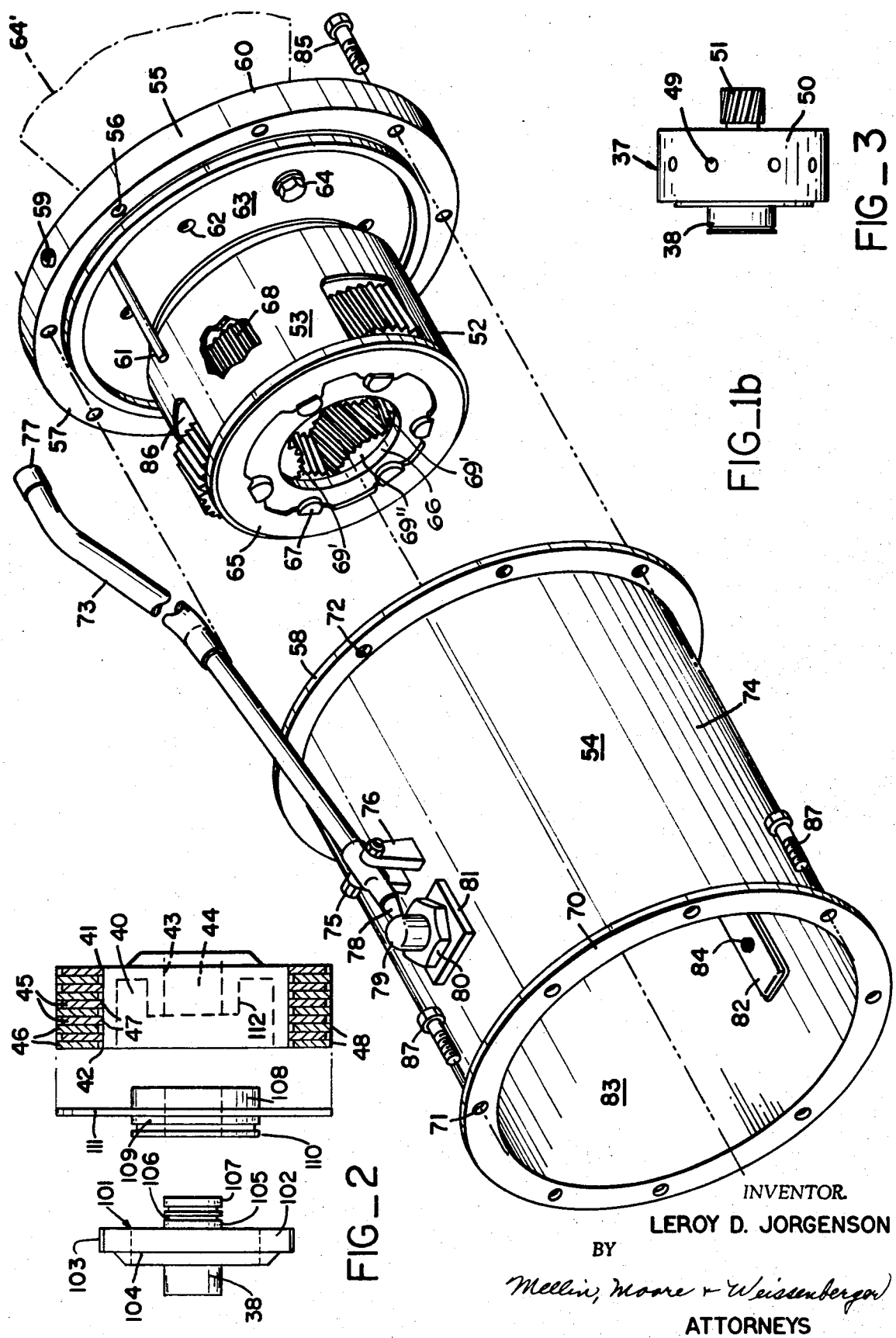

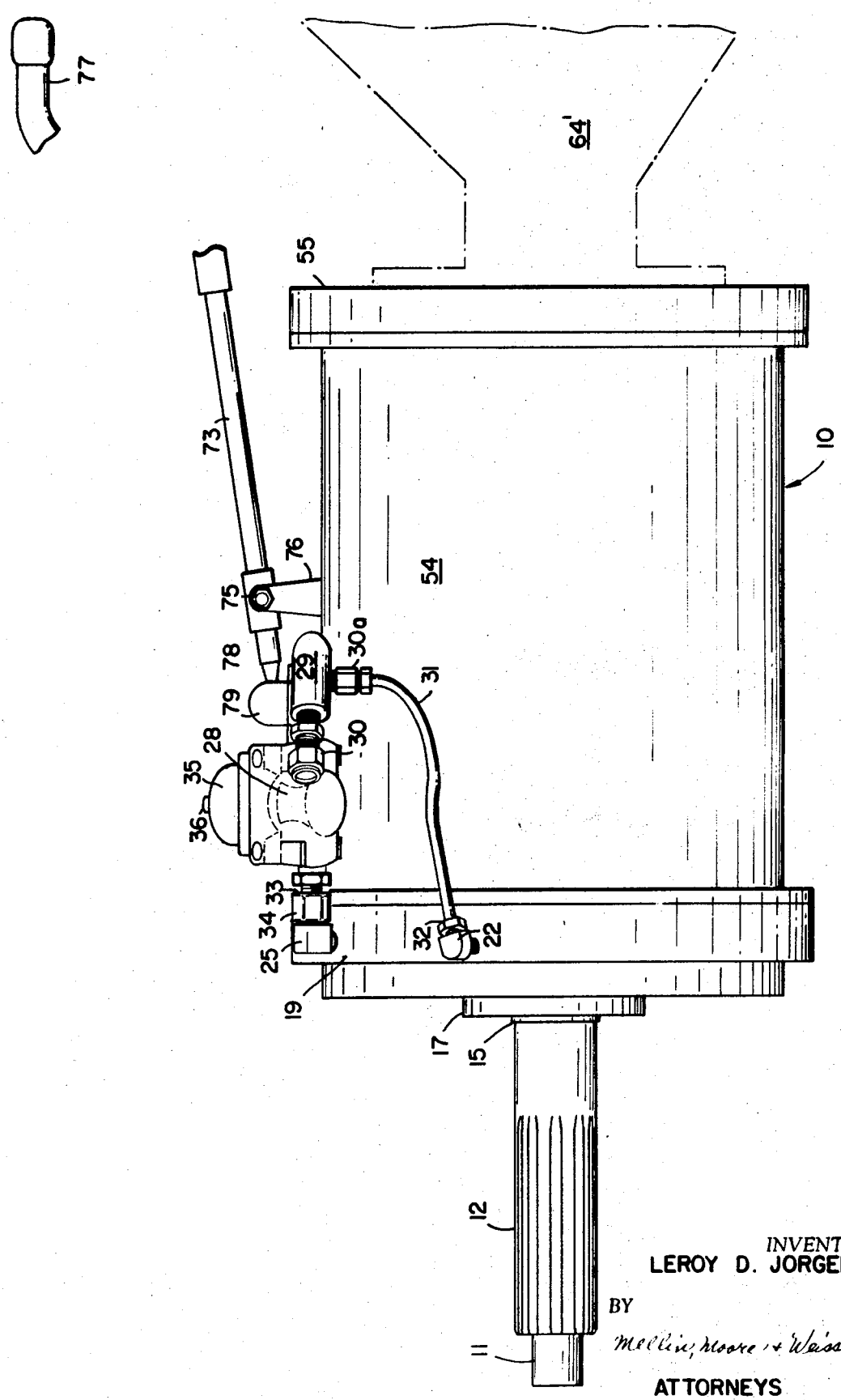

AUTOMATIC TRANSMISSION FOR A VEHICLE

BACKGROUND OF THE INVENTION

1. Field of the Invention

The invention relates to automatic transmission; and more particularly, to automatic transmissions for vehicles used in racing, such as dragstrip racers.

2. Description of the Prior Art

It is well know in the racing art that vehicles used therein such as dragstrip racers must be equipped with transmissions that permit such vehicles to accelerate at a very rapid pace and stand up under the heavy pressures due to competition racing. However, known transmissions have proven inadequate in the past since they can fail and wear rapidly under the severe conditions encountered in dragstrip racing, for example. Further, generally such transmissions are modifications of conventional automatic transmissions and not necessarily designed specifically for the use to which they are being put, namely, competition racing, for example. Thus, such transmissions require constant maintenance and replacement of broken parts in order to keep them running efficiently. Such costs generally prove prohibitive in the long run and there is much need in the racing field, including for example, boat racing, auto racing and the like, for an automatic transmission that can both stand up under the heavy stresses due to racing and provide the quick acceleration necessary for such racing.

SUMMARY OF THE INVENTION

It is an object of this invention to provide an improved automatic transmission for competition racing.

It is a further object of this invention to provide an automatic transmission which can quickly accelerate from low gear to high gear.

It is a still further object of this invention to provide an automatic transmission having quick acceleration and relatively few moving parts.

These and other objects are preferably accomplished by providing a transmission having an input shaft with gears at each end and a front end plate assembly thereon. A high gear clutch drum assembly includes a clutch for providing only a low and high forward speed and is in hydraulic fluid communication with a hydraulic fluid delivery sleeve on the front end plate assembly. A planetary gear assembly engages the gears on one end of the shaft and includes planetary gears for engaging gears on the clutch drum assembly. A housing encloses the shaft and all assemblies in a substantially fluid-tight relationship with the gears on the free end of the shaft adapted to be coupled to the clutch of the vehicle and a rear plate assembly including the planetary gear assembly being coupled in driving relationship to the differential of the vehicle. In this manner, the transmission can be moved quickly through gears as required for competition racing when hydraulic fluid is selectively supplied to the clutch drum assembly.

BRIEF DESCRIPTION OF THE DRAWING

FIG. 1 (1a and 1b) is an exploded perspective view of a preferred automatic transmission in accordance with the teachings of my invention;

FIG. 2 is an exploded view of a portion of the transmission of FIG. 1;

FIG. 3 is an end view of a portion of the transmission of FIG. 1; and

FIG. 4 is a vertical perspective view of a completed transmission in accordance with the teachings of my invention.

DESCRIPTION OF THE PREFERRED EMBODIMENT

Referring now to FIG. 1 of the drawing, an automatic transmission assembly 10 is shown adapted to be connected to the motor of a suitable vehicle, such as an automobile, a boat, or the like. However, because of the peculiar nature of my transmission as will be discussed further hereinbelow, my invention is particularly adapted to vehicles used in competition racing, as for example, dragstrip racers or the like.

Input Shaft Assembly

Thus, transmission assembly 10 includes an elongated input shaft 11 having gearing means, such as splines 12 and 13 at each end. Splines 12 are adapted to engage mating splines (not shown) on the conventional input shaft of the transmission (also not shown) of the engine of the vehicle into which it is desired to install assembly 10. Splines 13 are adapted to engage the sun gear of a planetary gearing system as will be discussed further hereinbelow. A third set of splines 14 or the like are disposed on shaft 11 between splines 12 and 13 and are adapted to engage the conventional frictional clutches of a clutch drum assembly as will be discussed shortly.

A bearing 15 surrounds shaft 11 between splines 12 and 14. Bearing 15 is maintained in position on shaft 11 by means of one or more snap rings (for example, snap ring 16 on one side of bearing 15 and a similar snap ring (not shown) on the other side), the ball bearings within bearing 15 not being visible in the drawing. A bearing retainer ring 17 fits over a reduced portion 15a of a bearing 15 which also includes a stepped portion 15b, and includes a plurality of apertures 18 therearound for bolting ring 17 to the clutch housing (not shown) of the vehicle into which it is desired to install the transmission of my invention.

Front End Plate Assembly

A front end plate assembly 19 slidably fits onto shaft 11 and has an inner cavity 19a into which retainer ring 17 sets. Assembly 19 includes a hydraulic fluid delivery sleeve 21 on the face adapted to be adjacent splines 14 when disposed on shaft 11. Sleeve 21 includes a conventional roller cam clutch (or over-run type clutch) associated therewith (not shown) for preventing the clutch drum from running in one direction as is well known in the automobile transmission art and thus further discussion is deemed unnecessary. Assembly 19 will occupy the space on shaft 11 between splines 14 and bearing 15 when so assembled onto ring 17.

A conventional lubrication inlet 22 is disposed about the outer periphery 23 of assembly 19 and is in fluid communication with the interior portion of assembly 19 (not shown). Inlet 22 may include a conventional metered orifice therein (not shown) for introducing a restricted amount of lubricating fluid thereto. A conventional breather vent 24 may also be disposed on periphery 23 also communicating with the interior of assembly 19. A hydraulic fluid clutch apply line 25 is also disposed on periphery 23 communicating with both the interior of the delivery sleeve 21 of assembly 19 and the atmosphere, as shown (i.e., prior to assembly).

Valve Assembly

The valve assembly 27 will now be described. Such valve assembly 27 preferably includes a valve housing 28 enclosing a suitable valve such as a conventional electro-magnetic or solenoid-actuated valve therein (not shown). A valve inlet 29 as preferably associated with the valve housing 28. Inlet 29 is in the preferred form of a Vee and includes a threaded assembly 30 as shown adapted to be connected to a conventional hydraulic fluid supply (not shown), such as a pump, for introducing hydraulic fluid, such as oil, under pressure through inlet 29. A hydraulic fluid outlet 30a preferably leads from inlet 29, in fluid communication therewith and is connected to a lubrication line 31 having a threaded assembly 32 adapted to be connected to lubrication inlet 22. A valve outlet 33 is associated with valve housing 28 and includes a threaded assembly 34 for connection to hydraulic fluid clutch apply line 25. It is to be understood that all connections are fluid-tight and any suitably means to carry this out may be used.

A suitable motor 35 is operatively connected to the valve within housing 28 and includes electric contacts, represented by reference numeral 36, which can be connected to a suitable source of electricity, such as an automobile battery, for supplying power to motor 35, thus activating the valve within housing 28. In this manner, hydraulic fluid can be selectively supplied to delivery sleeve 21 of assembly 19 as will be discussed further hereinbelow.

Clutch Drum Assembly

The high gear clutch drum assembly 37 will now be described. Clutch drum assembly 37 includes an outer sprag race 38 of a conventional sprag race assembly (not shown) adapted to fit over the oil delivery sleeve 21. A retainer ring 39 is disposed rearwardly of race 38 on the face of assembly 37 adapted to abut against end plate assembly 19 when the drum assembly 37 is mounted on shaft 11. Ring 39 holds a plurality of conventional multiple clutches inside of assembly 37. Such a multiple clutch assembly forms no part of this invention and any convenient type may be used.

For example, as shown in FIG. 2, the internal clutch assembly of drum assembly 37 is to be understood as having a conventional clutch hub 40 having outer splines 41 about its periphery 42 and inner splines 43 about its central hole 44. As shown, a plurality of lined multiple disc clutch plates 45 and 46, five of each being shown, engage hub 40. Clutch plates 45 are conventional lined drive plates having splines 47 about the periphery of their central hold for engaging splines 41 on hub 40. Clutch plates 46 are conventional driven steel plates, disposed adjacent plates 45, and have splines 48 about their outer periphery only.

Splines 43 enable hub 40 to be joined to shaft 11 through engagement with splines 14 thereon. A conventional clutch cylinder 101 includes the sprag race 38 at its forward end and race 38 is encircled by an outer portion 102 having splines 103 on its perimeter. Portion 102 also includes an inner cavity 104 for reasons to be discussed shortly. Portion 102 also includes a cylindrical portion 105 preferably having at least a pair of outer grooves 106 and 107 for receiving a conventional lip seal and snap-ring, respectively, (not shown).

A clutch apply piston 108 includes an inner hole 109 into which cylindrical portion 105 fits. Piston 108 also includes an outer groove 110 for receiving a lip seal therein (not shown). Piston 108 also has a face portion 111 adapted to abut against the first driven plate 46 on hub 40. A plurality of conventional coiled return springs (not shown) are disposed internally of piston 108 for returning the piston 108 to its initial position after actuation thereof.

In operation, piston 108 is disposed into hub 40 with face 111 engaging the first plate 46 and hole 109 fitting over the boss 112 of hub 40 with portion 105 of cylinder 101 fitting into hole 109. The various components are locked in place at one end by the snap ring engaging groove 107 and at the other end by retainer ring 39 with race 38 extending out of the hub assembly. In all of the foregoing, the actual operation of a multiple clutch assembly forms no part of my invention and further description of the workings of a conventional clutch would appear to be unnecessary.

Referring once again to FIG. 1, a plurality of locking holes 49 are disposed about the outer surface of the clutch drum 50 of the clutch drum assembly 37. As can be seen in FIG. 3, clutch drum assembly 37 includes a sun gear 51 at its end adjacent the planetary gear assembly 52 which will now be described. It is noted that sun gear 51 is not visible in FIG. 2 since its is located within clutch cylinder 101 (the sprag race 38 of the clutch drum assembly 37 of FIG. 3 being visible exterior of cylinder 101 in FIG. 2).

Planetary Gear Assembly

Planetary gear assembly 52 includes a main planetary cage portion 53 adapted to extend into the transmission case assembly 54 and a rear end plate 55. Rear end plate 55 includes a plurality of apertures 56 about its face 57, face 57 being adapted to abut against an outer flange or ring 58 on transmission case assembly 54. A breather vent 59 is disposed on the periphery 60 of end plate 55 and is in fluid communication with a breather tube 61 extending into the interior of assembly 52 above main portion 53 as shown.

Apertures 62 are provided in the face 63 of rear end plate 55 for receiving bolts 64 or the like therethrough for bolting the end plate 55 to the conventional differential 64', shown in phantom lines, of a vehicle. It is to be understood that the pinion shaft or gear (not shown) of differential 64' is keyed in driving engagement to cage portion 53 when so mounted in the conventional manner.

Main portion 53 includes a face portion 65 having a central hole 66 for receiving shaft 11 and sun gear 51 of clutch drum assembly 37. A plurality of journal pins 67 surround hole 66 and include the planetary gears for rotation therearound. The planetary gearing system includes a conventional sun gear 68 having a central hole with splines thereon for receiving splines 13 on shaft 11. The gears visible in windows 86 of cage portion 53 are large diameter gears 69'' adapted to engage gear 51 of the clutch driven assembly 50, three being preferably provided, with three smaller diameter gears 69' being disposed between the large diameter gears 69'' extending through cage portion 53 and into engagement with the outer gear teeth of sun gear 68.

Transmission Case Assembly

The transmission case assembly 54 serves as a housing to seal all of the elements in a substantially fluid-tight relationship, i.e. the portions of my transmission requiring a fluid-tight path for the hydraulic fluid. A front flange or ring 70 is provided similar to ring 58 and has apertures 71 therein aligned with apertures 19b about the outer portion of end assembly 19 (one such hole being shown in FIG. 1). A locking lever 73 is pivotally attached to the outer wall 74 of transmission case assembly 54 as by connection, through a nut-and-bolt arrangement 75 or the like, to a pair of spaced flanges 76 fixedly secured to the outer wall 74 of assembly 54. Locking lever 73 has a handle portion 77 at one end adapted to be grasped by the operator of the vehicle. The other end of locking lever 73 terminates in a tapered portion 78 fixedly secured to a pin 79, the axis of pin 79 being normal to the axis of tapered portion 78 and movable within an opening (not shown) extending through the outer wall 74 of transmission case assembly 54. Pin 79 includes an abutment member 80 thereon adapted to limit the downward movement of pin 79. The opening receiving pin 79 extends through plate 81 fixed to wall 74 so that the head of pin 79 enters the locking holes 49 on the clutch drum 50 of the clutch drum assembly 37. A baffle plate 82 may extend along the bottom inner wall 83 of assembly 54 and preferably secured in place by bolt 84. A suitable hole (not shown) may be disposed under plate 82 so that all of the hydraulic fluid may be deflected by plate 82 through the hole and out of the transmission case assembly 54.

Transmission Assembly

The assembly of the transmission assembly 10 will now be described. The input shaft 11 is arranged in bearing 15 so that shaft 11 rotates therein as is well known in the art. Bearing retainer ring 17 is placed onto shaft 11 and against the reduced portion 15a of bearing 15. The front end plate assembly 19 is now assembled on shaft 11 and is bolted to bearing retainer ring 17. The threaded assembly 34 of valve assembly 27 is now secured to the apply line 25 while threaded assembly 32 of the lubrication line 31 is secured to the lubrication inlet 22. The clutch drum assembly 37 is now assembled on shaft 11 with sprag race 38 passing onto and over hydraulic fluid delivery sleeve 21 of end plate assembly 19.

The planetary gear assembly 52 is now inserted into the rear of the transmission case assembly 54 and bolted thereto by means of bolts 85 passing through and threaded into aligned apertures 56 and 72. The subassembly which includes shaft 11, ring 17, end plate assembly 19, the valve assembly 17, and the clutch assembly 37 is now inserted into the opposite end of transmission case assembly 54. Sun gear 51 of clutch assembly 37 engages planetary gears 69 while splines 13 on input shaft 11 engage the central splined hole of sun gear 68 within the planetary gear assembly 52.

Splines 14 at the same time engage the inner splines 112 of clutch hub 40. Locking holes 49 are aligned with pin 79 when the various components are so assembled within assembly 54. Bolts 87 extend through and are threaded in aligned apertures 71 and 19b for fastening the various components together.

The assembled transmission assembly 10 is shown in FIG. 4. As can be seen, the transmission case assembly 54 encloses the various components in a fluid-tight arrangement. The splines 12 of shaft 11 enable assembly 10 to be connected to the conventional clutch of the motor of a vehicle while end plate 55 is shown as attached to the conventional 64' (in phantom lines) of the vehicle motor.

Operation

The low-gear operation of applicant's transmission will now be described in detail. As shaft 11 (FIG. 1a) rotates in a clockwise direction looking in the direction of the overall assembly 11, spline 13 engages sun gear 68 (FIG. 1b thus turning sun gear 68 also in a clockwise direction. Spline 14, in turn, also on shaft 11, engages splines 43 of hub 40 (FIG. 2). Hub 40, in turn, engages clutch plates 45 while plates 46 are in fixed rotary engagement with the interior of clutch drum 50, as is well known in the art.

In low gear, no oil pressure is applied to clutch drum assembly 37; thereby, plates 45 do not engage plates 46 which would allow hub 40 and clutch plates 45 to spin with shaft 11. That is, oil pressure would squeeze plates 45 and 46 together to move into high gear, as will be explained further hereinbelow. As sun gear 68 turns clockwise, it engages the small-diameter gears 69' within the main portion 53 of the planetary assembly 52. This causes gears 69' to rotate in a counterclockwise direction. As gears 69' rotate counterclockwise, the larger-diameter gears 69'', which are in mesh with the small-diameter gears 69', rotate in a clockwise direction due to this mesh. These latter gears 69'' mesh with sun gear 51 on clutch drum assembly 37, which would result in rotation of drum 50 in a counterclockwise direction (save for the locking action due to the sprag race 38 of a conventional sprag clutch assembly (not shown) on clutch drum assembly 37. A conventional sprag clutch assembly is to be understood as one which enables the clutch drum assembly 37 to turn in one direction but lock it from rotating in the opposite direction, and is well known in the automotive art. Thus, planetary gear assembly 52 must rotate in a clockwise direction (as does shaft 11). For every 1.8 turns of shaft 11, the planetary gear assembly 52 completes one turn. Of course, the relationship of the turns of shaft 11 to the turns of assembly 52 may be modified, if desired.

In order to operate assembly 10 in high gear, oil pressure is applied through valve 28 to clutch apply piston 108, which piston 108 squeezes clutch plates 45 to clutch plates 46, allowing plates 46 and clutch drum 50 to rotate at the same rate as shaft 11, clutch plates 45 and hub 40. As clutch drum 50 rotates with shaft 11 at the same rate, sun gear 51 rotates at the same rate as sun gear 68, thereby permitting the entire planetary gear assembly 52 to rotate at the same rate as shaft 11 and drum 50. With sun gears 51 and 68 rotating at the same rate as shaft 11, gears 69' and 69'' no longer rotate on their individual axes but rotate as a combined unit within assembly 52. The transmission assembly 10 is thus in high gear at a 1:1 ratio.

The operation of a conventional planetary gearing system which may be used in accordance with applicant's invention is described in a manual entitled "Automatic Transmission Service Guide," prepared by the Lincoln Technical Institute of Newark, New Jersey, and dated 1964. Section K, entitled "Ford Fordamatic Two-Speed Transmission" describes the operation of a conventional planetary gear system on pages 22-k and 42-k.

In operation, the shaft 11 is rotated by means of the clutch shaft of the motor of the vehicle engaging splines 12. At this time, sun gears 68 and planetary gears 69 are rotated through the engagement of splines 14 with splines 112 (and thus gear 51 with planetary gears 69) and splines 13 with sun gear 68. The clutch drum assembly 50 is held stationary through the roller cam clutch associated with the oil delivery sleeve 21. With the input being the same as the motor speed, the output of the gear ratios is 1.8:1 in low gear at all times. That is, the ratio of the speed of input shaft 11 to the speed of the pinion gear of the differential 64 is 1.8:1.

When is is desired to move into high gear, electrical power is supplied to the valve housing 28 and hydraulic fluid enters the hydraulic clutch apply line 25 and passes through the delivery sleeve 21 into the hub assembly within clutch drum assembly 37. This locks clutch hub 40 in a stationary position and permits the clutch drum 50 to rotate at engine speed, i.e., a 1:1 ratio of the speed of shaft 11 to the pinion gear of the differential 64'.

Locking lever 73 permits the clutch drum 50 of assembly 37 to be held in low gear until the engine of the vehicle is started, that is, lever 73 is pivoted so that pin 79 engages locking holes 49 on clutch drum 50. Preferably, hydraulic fluid may be supplied through line 31 when the valve is inactivated and through the metered orifice of inlet 22 for lubricating the internal components of the transmission assembly 10. Vent 24 permits the passage of any entrapped vapors therethrough. In like manner, tube 61 permits any entrapped vapors to be vented through vent 59.

The transmission assembly 10 described hereinabove is an integral unit requiring no drive shafts, U-joints or couplers to cause failure or misalignment. The unit may be used with a conventional multi-disc clutch such as is found in dragstrip racers. The unit is contained in a housing enclosure (i.e., the transmission case assembly 54) which may be a seamless steel housing, as for example, ¼-inch steel as required by the Rules of the National Hot Rod Association. The unit may be operated by the self-contained electro-hydraulic system as described and can be shifted either manually, as by flicking a simple toggle switch, or automatically, as by the use, for example, of an aircraft-type speed indicating device.

I claim as my invention:

1. In a transmission for a vehicle comprising:
   an elongated input shaft having first gearing means on one end adapted to mesh with an input shaft on the transmission of said vehicle, second gearing means on the opposite end adapted to mesh with a planetary assembly on said vehicle, and third gearing means intermediate said first and second gearing means;
   a front end plate assembly disposed on said shaft between said first and third gearing means and retained thereon, said plate assembly having a hydraulic fluid delivery sleeve encircling said shaft on the side of said plate assembly adjacent said planetary assembly;
   said front end plate assembly further including valve means thereon, said valve means comprising a valve, a hydraulic fluid inlet connected thereto, and at least one valve outlet leading therefrom, said valve outlet being in fluid communication with the interior of said delivery sleeve;
   a high gear clutch drum assembly having an outer race encircling said delivery sleeve and fourth gearing means on said drum assembly encircling said shaft adjacent said planetary assembly, said clutch drum assembly further including multiple clutch means therein meshing with said third gearing means and in fluid communication with said delivery sleeve;
   a planetary gear assembly having planetary gearing means therein meshing with said fourth gearing means and sun gearing means therein meshing with said second gearing means on said shaft, said planetary gear assembly having a rear end plate thereon adapted to abut against the differential of said vehicle; and
   housing means encircling all of said assemblies and said shaft for sealing said shaft and said assemblies in substantially fluid-tight relationship with said first gearing means extending out of said housing means.

2. The transmission of claim 1 wherein said front end plate assembly includes a bearing encircling said shaft between said first and third gearing means and said bearing is retained thereon by a bearing retainer ring encircling said bearing.

3. The transmission of claim 1 wherein said front end plate assembly includes a lubrication line connected to both the interior of said front end plate assembly and said hydraulic fluid inlet.

4. The transmission of claim 1 wherein said multiple clutch means includes a clutch hub meshing with said third gearing means in rotating relationship thereto, said hub including said fourth gearing means thereon.

5. The transmission of claim 1 wherein said clutch drum assembly includes a clutch drum enclosing said multiple clutch assembly, said drum having locking means on its outer surface adapted to lock the drum in stationary position; and
   locking lever means connected to said housing means adapted to selectively engage said locking means to lock said drum in a stationary position.

6. The transmission of claim 1 wherein said planetary gearing means includes six planetary gears surrounding said sun gear means, three of said planetary gears being larger in diameter than the remaining three planetary gears with one large-diameter planetary gear being disposed adjacent a smaller-diameter planetary gear, all of said smaller-diameter planetary gears being of a length sufficient to mesh with said sun gearing means, and said sun gearing means being a single sun gear disposed rearwardly of said planetary gears and centrally thereof and having a splined central aperture thereon for receiving said second gearing means and outer gear teeth for meshing with said smaller diameter planetary gears.

7. The transmission of claim 1 including a breather tube connected to said planetary gear assembly in fluid communication with both the atmosphere and said planetary and sun gears.

8. The transmission of claim 7 including a baffle disposed longitudinally of the inner bottom wall of said housing means; and at least one aperture disposed below said baffle communicating with both the atmosphere and the interior of said housing means.

9. The transmission of claim 1 wherein the ratio of the speed of said shaft to the pinion gear of said differential changes from 1.8:1 to 1:1 as hydraulic fluid under pressure is selectively applied to said oil delivery sleeve.

* * * * *